United States Patent [19]

Craster

[11] Patent Number: 4,912,686
[45] Date of Patent: Mar. 27, 1990

[54] SENSOR APPARATUS

[75] Inventor: William F. S. Craster, Weston-Super-Mare, United Kingdom

[73] Assignee: GEC-Marconi Limited, England

[21] Appl. No.: 288,254

[22] PCT Filed: Apr. 25, 1988

[86] PCT No.: PCT/GB88/00315

§ 371 Date: Dec. 13, 1988

§ 102(e) Date: Dec. 13, 1988

[87] PCT Pub. No.: WO88/08605

PCT Pub. Date: Nov. 3, 1988

[30] Foreign Application Priority Data

Apr. 27, 1987 [GB] United Kingdom ............... 8709903

[51] Int. Cl.⁴ ............................................. G01F 23/28
[52] U.S. Cl. ..................................... 367/140; 367/104; 73/290 V; 340/612; 340/621
[58] Field of Search ............... 367/908, 165, 173, 104, 367/140, 191; 73/290 V; 33/125 W; 340/621, 612

[56] References Cited

U.S. PATENT DOCUMENTS

| | | | |
|---|---|---|---|
| 2,452,068 | 10/1948 | Peterson | 73/290 V |
| 3,039,077 | 6/1962 | Lasky et al. | 340/5 |
| 3,553,638 | 1/1971 | Sublett | 340/3 |
| 4,000,650 | 1/1977 | Snyder | 73/290 V |
| 4,355,536 | 10/1982 | McShane et al. | 73/290 V |

FOREIGN PATENT DOCUMENTS

| | | |
|---|---|---|
| 0098558 | 1/1984 | European Pat. Off. . |
| 0118206 | 2/1984 | European Pat. Off. . |
| 0203717 | 12/1986 | European Pat. Off. . |
| 1766360 | 7/1971 | Fed. Rep. of Germany . |
| 3405537 | 8/1985 | Fed. Rep. of Germany . |
| 0144523 | 11/1980 | Japan . |
| 0630004 | 5/1946 | United Kingdom . |
| 2184541 | 6/1987 | United Kingdom . |
| 8302001 | 6/1983 | World Int. Prop. O. . |

Primary Examiner—Charles T. Jordan
Assistant Examiner—J. Woodrow Eldred
Attorney, Agent, or Firm—Kirschstein, Ottinger, Israel & Schiffmiller

[57] ABSTRACT

A sensor apparatus for detecting sludge in a tank e.g. an oil storage tank, wherein sonar tarnsmission and reception is effected by a transducer (29) whose acoustic center is coincident with the center of curvature of a liquid filled part spherical sonar dome part (15) of a housing (13) for the apparatus. The acoustic pressure waves consequently pass through the dome part of the housing in a direction normal to its surfaces thus minimizing velocity, amplitude and phase changes of the waves as they pass to and from the transducer, and avoiding blind spots in the area monitored by sensor apparatus. Preferably, the apparatus further includes an arrangement (31, 33, 35, 37) within the housing for angularly moving the transducer (29) about two orthogonal axes which intersect at said center of curvature.

12 Claims, 1 Drawing Sheet

SENSOR APPARATUS

BACKGROUND OF THE INVENTION

1. Field of the Invention

This invention relates to sensor apparatus.

More particularly the invention relates to sensor apparatus suitable for use in a system for detecting sludge in a tank, particularly storage tanks for oil or oil tanker ballast.

2. Description of Related Art

A sensor apparatus for such an application is often required to operate in a hazardous environment so that it is necessary that electrical components of the sensor be isolated from the environment without impairing the performance of the sensor.

SUMMARY OF THE INVENTION

It is an object of the present invention to provide a sensor apparatus meeting these requirements.

According to the present invention a sensor apparatus for use in a system for detecting sludge in a tank comprises: a housing adapted to be supported within the tank and including a part in the form of a sonar dome of part-spherical form filled with a liquid; and a sonar receiving and transmitting transducer disposed within said housing and having an effective acoustic centre which is substantially coincident with the centre of curvature of said sonar dome.

Preferably said apparatus further includes means within said housing for angularly moving said transducer about two orthogonal axes which intersect substantially at said centre of curvature. In one particular such arrangement one of said two orthogonal axes is defined by a shaft disposed with its axis coincident with said one axis and arranged for rotation about its axis, and said transducer is carried on a member mounted on said shaft at one end thereof and arranged for rotation about the other one of said two orthogonal axes.

Said sonar dome is suitably of hemispherical form.

Normally said sonar dome part is arranged to constitute a lower part of said housing when the apparatus is supported within the tank.

An apparatus according to the invention is suitably adapted to be supported within the tank from a roof part of the tank. To this end an apparatus according to the invention is suitably adapted for support within the tank by means of a tubular member adapted to be secured at one end to the roof of the tank with a part of the housing of the apparatus received within the other end of the tubular member and said sonar dome projecting downwardly therefrom.

BRIEF DESCRIPTION OF THE DRAWINGS

One system for detecting sludge in a tank incorporating a sensor apparatus in accordance with the invention will now be described by way of example with reference to the accompanying drawings in which.

DETAILED DESCRIPTION OF THE PREFERRED EMBODIMENTS

Figure 1:
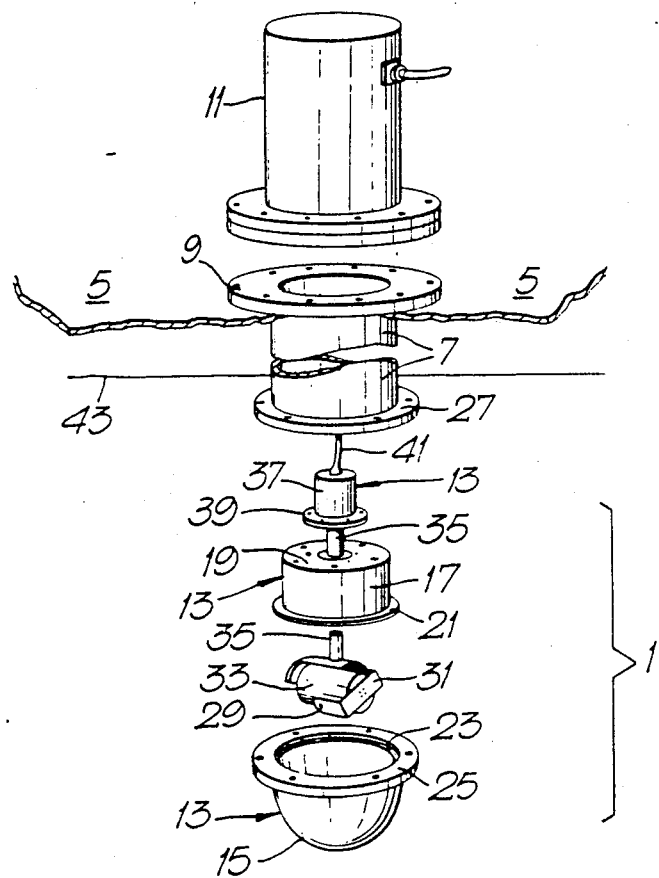
FIG. 1 is a pictorial representation showing the tank with a portion of the wall thereof broken away and the sensor apparatus supported from the roof thereof.
Figure 2:
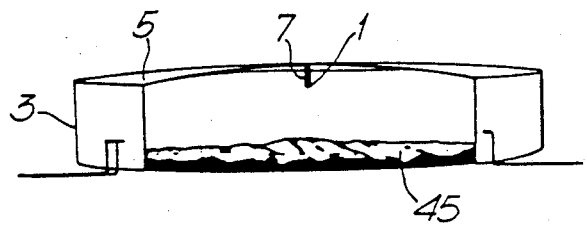
FIG. 2 is an exploded pictorial view of the sensor apparatus and related support structure therefor.

Referring to FIG. 2 of the drawings the apparatus 1 is supported within a storage tank 3 from the centre of the roof 5 thereof at the lower end of a tube 7 so as to lie, when the tank is full, below the level of the material stored in the tank. Referring now also to FIG. 1, the tube 7, which is typically of diameter 20 centimeters and length 3 meters, is secured to the tank roof 5, with its axis vertical, by a flange 9 external of the roof 5. Surmounting the flange 9 and secured thereto there is a flameproof housing 11 containing electronics (not shown) for the sensor apparatus 1.

The sensor apparatus 1 comprises a housing 13 having a lower part comprising a hemispherical sonar dome 15 and an upper part comprising an inverted dish-shaped member 17 having in its base a central aperture 19 and having a rim portion 21 adapted to sit in a circumferentially extending rebate 23 formed around the inner marginal surface of an equatorial flange 25 of the dome 15.

The housing 13 is secured to the bottom end of the tube 7 by means of bolts (not shown) passing through holes in the flange 25 of the dome 15 and corresponding holes in a flange 27 at the bottom of the tube 7, the dish-shaped member 17 being received within the lower end of the tube 7 with its rim portion 21 trapped between the flanges 25 and 27.

Within the housing 13 there is located a sonar transmitting and receiving transducer 29. The transducer 29, which is typically in the form of a small disc of piezoelectric material, is mounted on a bracket 31 secured to the drive shaft of a first stepper motor 33. The stepper motor 33 is secured to the lower end of a shaft 35 which extends vertically through the member 17 and through the aperture 19 in the base of the member 17, the axis of the drive shaft of the motor 33 being horizontal and orthogonally intersecting the axis of the shaft 35 at the centre of curvature of the sonar dome 15. The shaft 35 is rotatable about its axis by a second stepper motor 37 secured at a flange 39 of the casing of the motor 37 to the upper surface of the base of the member 19. The casing of the motor 37 thus closes the aperture 19 to complete the housing 13.

The transducer 29 is thus rotatable by means of the motor 37 about the axis of the shaft 35 and is rotatable by means of the motor 33 about the axis of the drive shaft of the motor 33. The transducer 29 is positioned on the bracket 31 so that it rotates about the drive shaft of the motor 33 in a plane containing the axis of the shaft 35 and produces a sonar beam when transmitting whose axis passes through the point of intersection of the drive shaft of the motor 33 and the axis of the shaft 35. Hence the transducer 29 is positioned on the bracket 31 so that its effective acoustic centre is coincident with the intersection of the axis of the shaft 35 and the axis of the drive shaft of the motor 33, i.e. with the centre of curvature of the sonar dome 15. It will be appreciated that the effective acoustic centre of a sonar transducer is the point from which acoustic waves appear to emanate when the transducer is transmitting.

The space within the tube 7 and the housing 13, apart from that occupied by parts of the sensor apparatus 1, is totally filled with a transformer or silicone oil or other electrically insulating fluid (not shown).

Electrical connections between the sensor apparatus 1 and the electronics housed in the flameproof housing 11 are provided by way of cabling 41 extending through the tube 7.

It will be understood that the sonar dome 15, the tube 7 and the flameproof housing 11 together form an enclosure which isolates the system from its environment and thus renders the system suitable for use in a hazardous environment. In this connection it will be appreciated that the system may easily be designed to operate in a zone 1 area as defined in British Standards Specifications, and the region through which the tube 7 extends, i.e. from the roof 5 of the tank 3 to the upper surface of the material stored in the tank 3, as indicated by line 43 in FIG. 1, may be a zone zero area as defined in British Standards Specifications.

In operation of the system the transducer 29 is rotated about the axis of the shaft 35 by the motor 37 and oscillated by the motor 33 about the axis of the drive shaft of the motor 33 to scan the bottom of the tank 3 and hence any sludge 43 which has collected there. A map and/or profiles showing the distribution of the sludge 43 is produced and recorded from data obtained by monitoring echoes detected by the transducer 29 as a result of acoustic pulse pressure waves transmitted by the transducer 29 in known manner.

Each such acoustic pulse pressure wave and its echo passes between the transducer 29 and the sludge via the oil in the housing 13, the material stored in the tank 3, and the sonar dome 15 which isolates the interior of the housing 13 from the interior of the tank 3.

Acoustic pulse pressure waves upon passing through sonar domes are subject to change in velocity, reduction in amplitude and change of phase, the extent of these variations being functions of the angle at which the pressure wave is incident on the dome. Indeed if the pressure wave is incident on a dome at a certain oblique angle the wave may be substantially completely absorbed. In the case of a fibreglass dome the angle of incidence at which this occurs is between 40° and 50°. The effect referred to is commonly known as 'spokeing'. The material of the dome and its thickness and the sonar frequency are factors affecting the response characteristics of the dome. If the dome is of a metal its thickness has to be 'tuned' so as to be transparent at the sonar operating frequency.

With the arrangement described by way of example, and other arrangements according to the invention, by virtue of the effective acoustic centre of the transducer 29 being at the centre of curvature of the dome 15, the sonar pressure waves pass through the wall of the dome 15 substantially normally. In consequence there are no blind spots in the area scanned by the sensor apparatus, the systems electronics needs only provide gain change and time change facilities to account for the velocity change effect due to passage of the wave through the dome 15 and no dome blind spots are introduced into the recorded data. Furthermore, velocity, amplitude, and phase changes of the waves are as they pass to and from the transducer 29 are minimised.

I claim:

1. A sensor apparatus for use in detecting sludge in a tank comprising: a housing supported within the tank and including a part in the form of a sonar dome of substantially hemispherical form filled with a liquid and having a centre of curvature; and a sonar receiving and transmitting transducer disposed for angular movement within said housing and having an effective acoustic centre during angular movement which is substantially coincident with the centre of curvature of said sonar dome.

2. An apparatus according to claim 1 further including means within said housing for angularly moving said transducer about two orthogonal axes which intersect substantially at said centre of curvature.

3. An apparatus according to claim 2 wherein one of said two orthogonal axes is defined by a shaft disposed with its axis coincident with said one axis and arranged for rotation about its axis, and said transducer is carried on a member mounted on said shaft at one end thereof and arranged for rotation about the other one of said two orthogonal axes.

4. An apparatus according to claim 3 wherein said transducer is positioned on said member carrying said transducer so as to be spaced from said other one of said two orthogonal axes.

5. An apparatus according to claim 3 including a second electric motor arranged to rotate said first-mentioned shaft.

6. An apparatus according to claim 5 wherein said second electric motor is disposed at the end of said housing opposite to said sonar dome.

7. An apparatus according to claim 1 wherein said sonar dome is of hemispherical form.

8. An apparatus according to claim 1 arranged so that said sonar dome constitutes a lower part of said housing when the apparatus is supported within the tank.

9. An apparatus according to claim 8 further including means within said housing for angularly moving said transducer about two orthogonal axes which intersect substantially at said center of curvature, one of said two orthogonal axes extending substantially normal to a roof part of the tank when the apparatus is supported within the tank.

10. An apparatus according to claim 1 adapted to be supported within the tank from a roof part of the tank.

11. An apparatus according to claim 10 in combination with a tubular member adapted to be secured at one end to said roof part of the tank with a part of the housing of the apparatus received within the other end of the tubular member and said sonar dome projecting downwardly therefrom.

12. A sensor apparatus for use in detecting sludge in a tank, comprising: a housing supported within the tank and including a part in the form of a sonar dome of substantially hemispherical form filled with a liquid and having a centre of curvature; a sonar receiving and transmitting transducer disposed for angular movement within said housing and having an effective acoustic centre during angular movement which is substantially coincident with the centre of curvature of said sonar dome; and means within said housing for angularly moving said transducer about two orthogonal axes which intersect substantially at said centre of curvature, one of said two orthogonal axes being defined by a shaft disposed with its axis coincident with said one axis and arranged for rotation about its axis, and said transducer being carried on a member mounted on said shaft at one end thereof and arranged for rotation about the other end of said two orthogonal axes, said member carrying said transducer being mounted on a drive shaft of an electric motor secured to said first-mentioned shaft, said drive shaft defining the other one of said two orthogonal axes.

* * * * *